United States Patent
Delmerico et al.

(10) Patent No.: US 8,013,461 B2
(45) Date of Patent: Sep. 6, 2011

(54) POWER CONVERSION SYSTEM AND METHOD FOR A ROTARY POWER GENERATION SYSTEM

(75) Inventors: Robert William Delmerico, Clifton Park, NY (US); Xiaoming Yuan, Shanghai (CN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/820,354

(22) Filed: Jun. 22, 2010

(65) Prior Publication Data

US 2011/0140438 A1    Jun. 16, 2011

(51) Int. Cl.
*F03D 9/00*    (2006.01)
*H02P 9/00*    (2006.01)

(52) U.S. Cl. ........................... 290/44; 322/44

(58) Field of Classification Search ............... 290/44, 290/55; 415/1; 322/19, 28, 44; 416/1
See application file for complete search history.

(56) References Cited

U.S. PATENT DOCUMENTS

| | | | |
|---|---|---|---|
| 4,703,189 A | 10/1987 | DiValentin et al. | |
| 5,083,039 A | 1/1992 | Richardson et al. | |
| 5,225,712 A * | 7/1993 | Erdman | 290/44 |
| 5,652,485 A * | 7/1997 | Spiegel et al. | 318/147 |
| 5,798,631 A | 8/1998 | Spee et al. | |
| 7,042,110 B2 | 5/2006 | Mikhail et al. | |
| 7,271,571 B2 * | 9/2007 | Ye et al. | 322/36 |
| 7,394,166 B2 * | 7/2008 | Teichmann et al. | 290/44 |
| 7,425,771 B2 * | 9/2008 | Rivas et al. | 290/44 |
| 7,511,385 B2 | 3/2009 | Jones et al. | |
| 7,692,321 B2 * | 4/2010 | Jones et al. | 290/43 |
| 2007/0108771 A1 * | 5/2007 | Jones et al. | 290/44 |
| 2008/0150285 A1 * | 6/2008 | Corcelles Pereira et al. | 290/44 |
| 2008/0252076 A1 * | 10/2008 | Fortmann et al. | 290/44 |
| 2009/0096211 A1 * | 4/2009 | Stiesdal | 290/44 |
| 2010/0072751 A1 * | 3/2010 | Andersen et al. | 290/44 |

FOREIGN PATENT DOCUMENTS

| | | |
|---|---|---|
| EP | 1925817 A2 | 5/2008 |
| WO | 2007054729 A1 | 5/2007 |
| WO | 2007132303 A1 | 11/2007 |
| WO | WO 2007132303 A1 * | 11/2007 |

* cited by examiner

*Primary Examiner* — Julio Gonzalez
(74) *Attorney, Agent, or Firm* — Ann M. Agosti

(57) ABSTRACT

A power generation system includes a rotary power generator for generating a variable-frequency alternating current, a generator side converter for converting the variable-frequency alternating current into a DC current, a DC link coupled to the generator side converter for receiving the DC current, a line side converter coupled to the DC link for converting the DC current into an alternating current with controlled amplitude or frequency, a generator side controller for receiving a DC link voltage command signal and a DC link voltage feedback signal and generating control signals for the generator side converter, and a line side controller for receiving a generator torque command signal and a generator torque feedback signal and generating control signals for the line side converter.

14 Claims, 3 Drawing Sheets

POWER CONVERSION SYSTEM AND METHOD FOR A ROTARY POWER GENERATION SYSTEM

BACKGROUND

The present invention relates generally to power conversion systems. More particularly, the invention relates to a power conversion system used in a rotary power generation system for converting a variable-frequency alternating current produced by a variable-speed rotary power generator into an alternating current with controlled amplitude or frequency for feeding an electric grid.

One type of power generation system comprises a rotary power generator for generating an alternating current with a variable frequency by rotation of a generator rotor and a power conversion system for converting the variable-frequency alternating current into an alternating current with controlled amplitude or frequency to be supplied to an electric grid. One example of such a power generation system comprises a variable-speed wind turbine power generation system.

Variable-speed wind turbine power generation systems include generators with rotation speeds that vary with wind speed and generate an alternating current with a variable frequency. Variable speed wind turbine generators can provide more energy over a range of wind speeds as compared with wind turbine generators requiring a constant speed of operation.

Power conversion systems for variable-speed wind turbines typically include a generator side power electronic converter ("generator side converter") for converting the variable-frequency alternating current into a direct current at a DC link and a line (or grid) side power electronic converter ("line side converter") for converting the direct current at the DC link into an alternating current with controlled amplitude or frequency for feeding the grid. It is desirable to transmit as much of the wind power to the grid as possible while protecting the power generation system under different wind and grid conditions.

BRIEF DESCRIPTION

In accordance with one exemplary embodiment of the present invention, a power generation system is provided. The power generation system comprises a rotary power generator for generating a variable-frequency alternating current, a generator side converter for converting the variable-frequency alternating current into a DC current, a DC link coupled to the generator side converter for receiving the DC current, a line side converter coupled to the DC link for converting the DC current into an alternating current with controlled amplitude or frequency, a generator side controller for receiving a DC link voltage command signal and a DC link voltage feedback signal and generating control signals for the generator side converter, and a line side controller for receiving a generator torque command signal and a generator torque feedback signal and generating control signals for the line side converter.

In accordance with another exemplary embodiment of the present invention, a wind turbine power generation system is provided. The wind turbine power generation system comprises a wind turbine for generating a variable-frequency alternating current driven by wind and a power conversion module. The power conversion module comprises a generator side converter for converting the variable-frequency alternating current into a DC current, a DC link coupled to the generator side converter for receiving the DC current, a line side converter coupled to the DC link for converting the DC current into an alternating current with controlled amplitude or frequency, and a power conversion control system. The power conversion control system comprises a generator side controller for receiving a DC link voltage command signal and a DC link voltage feedback signal and generating control signals for the generator side converter, and a line side controller for receiving a generator torque command signal and a generator torque feedback signal and generating control signals for the line side converter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein relate to a power conversion control system for controlling operation of a power conversion module for converting a variable-frequency alternating current generated by a rotary power generator into an alternating current with controlled amplitude or frequency for feeding an electric grid. As used herein, or is intended to be inclusive such that "controlled amplitude or frequency" is intended to include controlled amplitude, controlled frequency, or both controlled amplitude and controlled frequency. The power conversion module comprises a generator side converter, a line side converter, and a DC link between the generator side and line side converters. The power conversion control system uses a torque control command to control operation of the line side converter and uses a DC link control command to control operation of the generator side converter. Although exemplary figures illustrate wind power generation systems for purposes of example, embodiments of the invention are applicable to any rotary power generation system having a rotary power generator that is operated at a variable speed and a power conversion module for converting electric power having a variable frequency alternating current generated by the rotary power generator to electric power having an alternating current with a different frequency, a different phase angle, or both. The rotary power generators may include, for example, variable-speed wind turbines, gas turbines, micro-turbines, and marine hydro kinetic devices.

Figure 1:
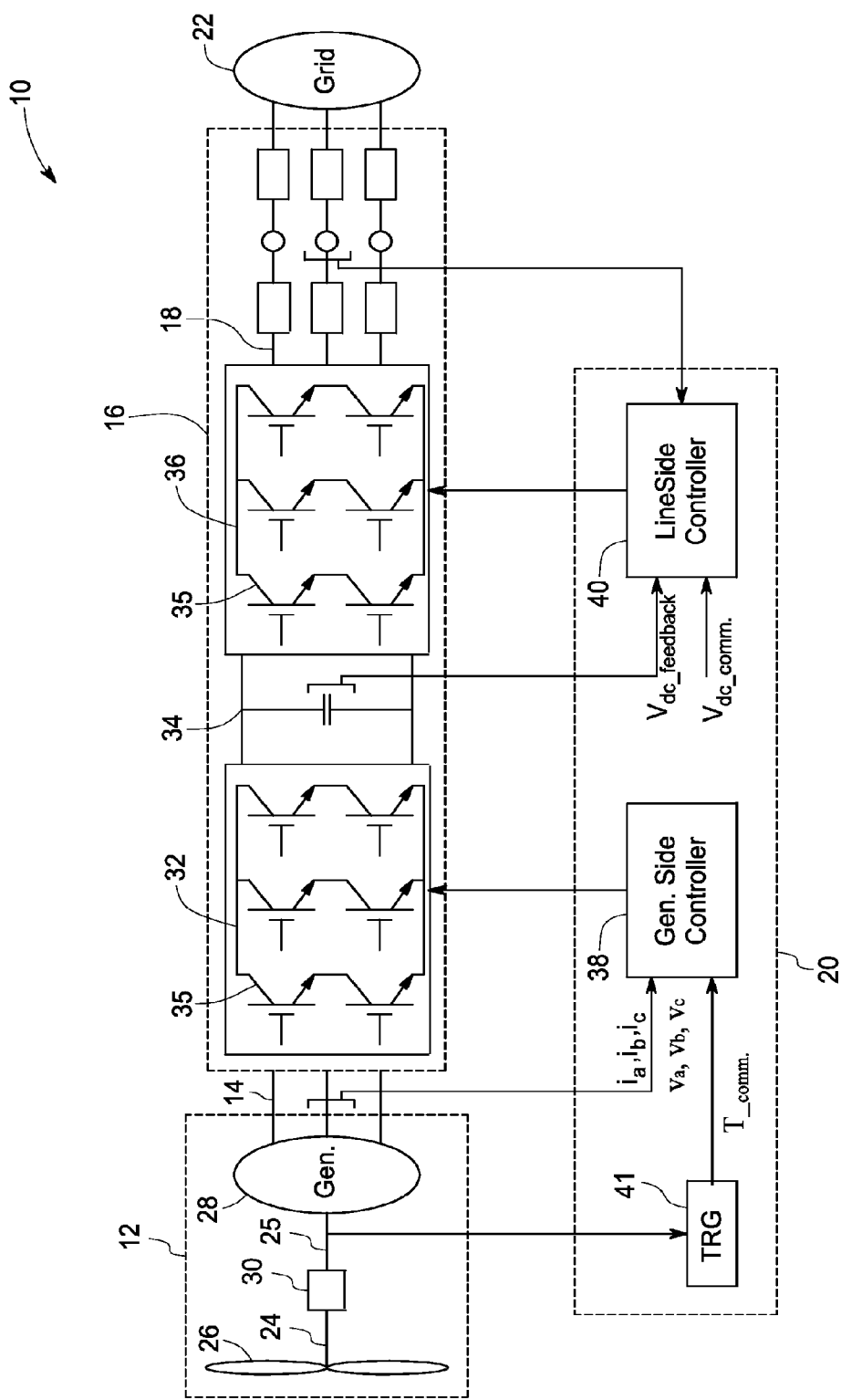
FIG. 1 is a block diagram of a conventional power generation system electrically coupled to an electric grid.

Reference is first made to a conventional rotary power generation system which is a conventional variable-speed wind turbine power system 10 (herein after "system 10") as illustrated in FIG. 1. System 10 comprises a variable-speed wind turbine generator 12 (herein after "turbine 12") for generating an alternating current on phase conductors 14 with a variable frequency, a power conversion module 16 for converting the variable-frequency alternating current on phase conductors 14 into an alternating current on phase conductors 18, and a conventional power conversion control system 20 for receiving several reference signals and commands for generating control signals for controlling operation of power conversion module 16. Alternating current on phase conductors 18 is further fed to an electric grid 22.

Turbine 12 comprises a plurality of turbine blades 26, and a generator 28 having a generator rotor (not shown) and a generator stator (not shown). The pitch of turbine blades 26 is variable and may be controlled. Turbine blades 26 are coupled to a first rotatable shaft 24 which in some embodiments is mechanically coupled to a gearbox 30. Gearbox 30 is further coupled to the generator rotor through a second rotatable shaft 25 to drive the generator rotor to rotate. Gearbox 30 typically includes a step-up speed transmission with a fixed ratio so that the generator rotor rotates at a fixed multiple speed of the first rotatable shaft. The generator air gap is distributed with a magnetic flux field (F), and rotation of the generator rotor induces the alternating current on phase conductors 14 from windings on the generator stator. Accordingly, alternating current on phase conductors 14 has a variable frequency and a variable magnitude which is proportional to the rotation speed of the first rotating shaft 24 (or the second rotating shaft or the generator rotor) and the magnetic flux F.

As is illustrated, power conversion module 16 comprises a generator side converter 32, a DC link 34, and a line side converter 36. Generator side and line side converters 32, 36 each include a plurality of semiconductor switches 35, such as IGBTs, IGCTs, MOSFETs, and the like. Generator side converter 32 receives variable-frequency alternating current on phase conductors 14 from generator 28 and converts alternating current on phase conductors 14 into a DC current at DC link 34. Line side converter 24 receives the DC current at DC link 34 and converts the DC current into an alternating current 18 with controlled magnitude and/or frequency for feeding electric grid 22.

The illustrated conventional power conversion control system 20 includes a generator side controller 38 and a line side controller 40. Generator side and line side controllers 38, 40 respectively receive a number of reference signals and commands and respectively generate pulse width modulation (PWM) control signals for the generator side and line side converters 32, 36. As is illustrated, the conventional power conversion control system 20 uses a torque reference generator (TRG) device 41 to direct the power trajectory of turbine 26 and generate a torque command signal $T_{\_comm}$. Generator side controller 38 receives the torque command signal $T_{\_comm}$, and uses an interrelationship between the torque command signal and alternating current on phase conductors 14 (such as a measured three-phase current and voltage signals $i_a$, $i_b$, $i_c$ and $v_a$, $v_b$, $v_c$) to generate a PWM control signal for controlling switching operations of semiconductor switches 35 of generator side converter 32. In one embodiment, generator side controller 38 uses the alternating current on phase conductors 14 to generate a torque feedback signal $T_{\_feedback}$ and then uses the torque command $T_{\_comm}$ and the torque feedback signal $T_{\_feedback}$ to generate the PWM control signal for generator side switches to control the generator torque. In certain embodiments, the torque feedback signal $T_{\_feedback}$ can be obtained by searching in a look-up table, by observing measured results, or by observing a correlation function of generator torque and the alternating current.

Line side converter 40 receives a DC link voltage command signal $V_{dc\_comm}$, and a measured DC voltage feedback signal $V_{dc\_feedback}$ of DC link 34 and uses these signals to control switching operations of semiconductor switches 35 of line side converter 40 and maintain the DC link voltage at a desired level.

Using such a conventional power conversion control system 20, performance of the line side converter 40, to maintain DC link voltage, may be compromised by an ill behaved grid. For example, if grid 22 is very weak or has an electrical resonance, due to shunt or series connected capacitance, the line side converter 40 DC link voltage control may become unstable.

Figure 2:
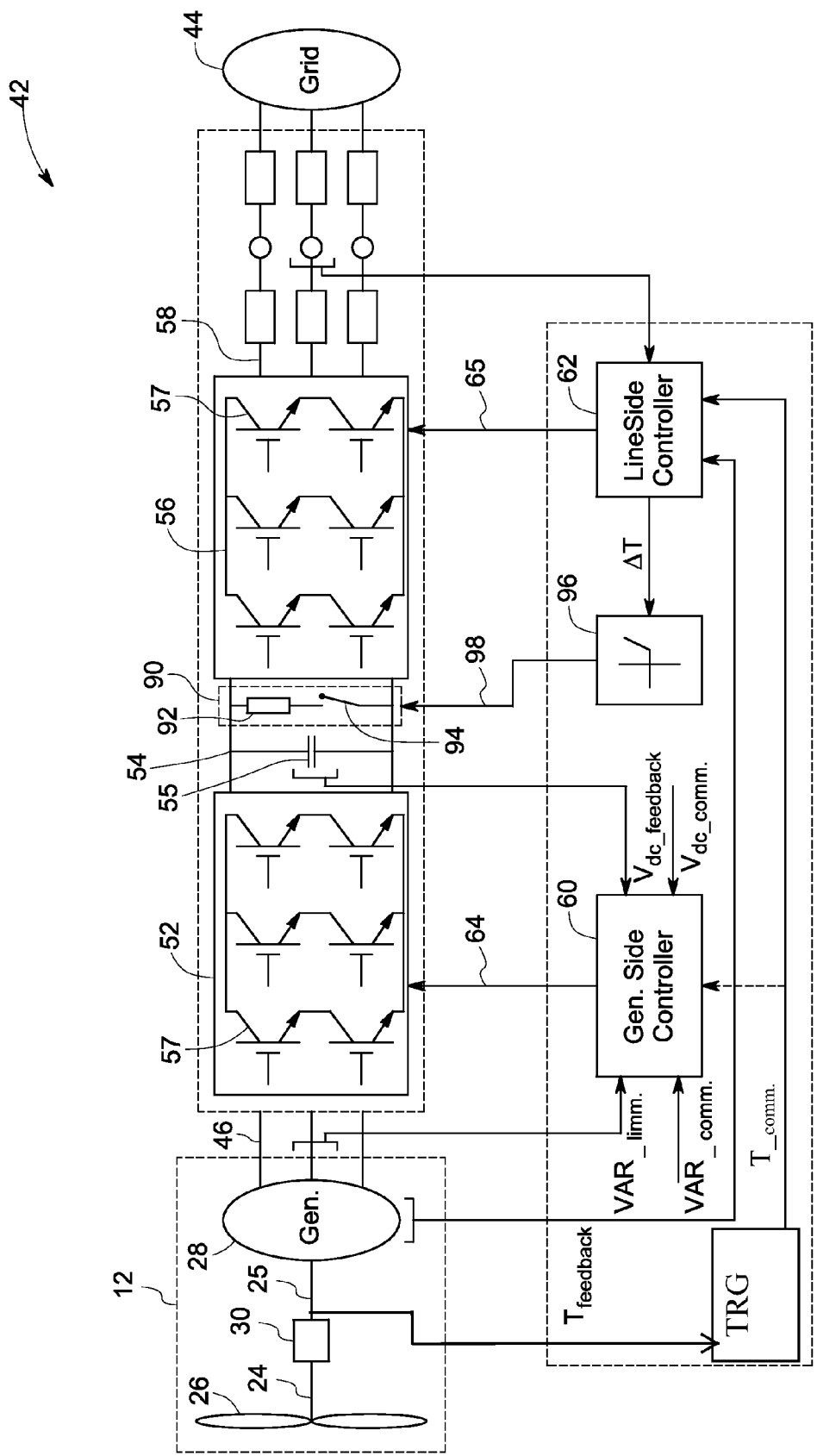
FIG. 2 is a block diagram of a power generation system electrically coupled to an electric grid in accordance with one embodiment of the present invention.

Referring to FIG. 2, an exemplary rotary power generation system 42 comprising a power conversion control system 50 according to one embodiment of the invention is illustrated. The exemplary rotary power generation system 42 ("system 42") includes a rotary power generator, which in one embodiment comprises a wind turbine generator 12 ("turbine 12"), a power conversion module 48 electrically coupled to both turbine 12 and to grid 44, and power conversion control system 50 for controlling operation of the power conversion module 48. In the illustrated embodiment, turbine 12 has a similar configuration as the conventional turbine described above with reference to FIG. 1. In other embodiments, turbine 12 may comprise any rotary power generator including, for example, other types of variable-speed wind turbines, gas turbines, micro-turbines, and marine hydro kinetic devices.

In the illustrated embodiment, power conversion module 48 comprises a generator side converter 52, a DC link 54, and a line side converter 56. DC link 54 comprises at least one capacitor 55. Generator side and line side converters 52, 56 may comprise bi-directional converters, and each include a plurality of semiconductor switches 57, such as IGBTs, IGCTs, and the like. Generator side converter 52 receives variable-frequency alternating current on phase conductors 46 from turbine 12 and converts alternating current on phase conductors 46 into a DC current at DC link 54. Line side converter 56 receives the DC current at DC link 54 and converts the DC current into an alternating current on phase conductors 58 with controlled amplitude and/or frequency for feeding electric grid 44.

In the illustrated embodiment, conversion control system 50 comprises a generator side controller 60 and a line side controller 62 for controlling operations of generator side and line side converters 52, 56. In certain embodiments of the invention, generator side controller 60 and line side controller 62 respectively govern DC link voltage control and generator torque control. Generator side and line side controllers 60, 62 may be physically separated or may situated within an integrated control unit.

In the illustrated embodiment of FIG. 2, generator side controller 60 receives a DC link voltage command $V_{dc\_comm}$ representing a desired DC voltage at DC link 54, and a measured DC link voltage feedback signal $V_{dc\text{-}feedback}$. Generator side controller 60 uses a DC link voltage difference (the difference of the DC link voltage command signal and the DC link voltage feedback signal) to generate a PWM control signal 64 for controlling switching operations of the semiconductor switches 57 of generator side converter 52. When there is a decrease in the DC voltage at the DC link and the measured DC link voltage feedback signal $V_{dc\text{-}feedback}$ decreases, generator side controller 60 controls generator side converter 52 to increase the power flow from turbine 12. When there is an increase in the measured DC link voltage feedback, the opposite control action occurs. In either event, it is useful to provide the PWM control signal 64 in a manner to ensure that the output DC link voltage is maintained at a desired nominal level.

In the illustrated embodiment of FIG. 2, generator side controller 60 also receives a VAR command signal ($VAR_{\_comm}$) indicative a desired VAR output of the generator and a voltage limit signal ($VAR_{\_limm}$) indicative of a desired maximum level of voltage allowed at the generator stator terminals. In certain embodiments, the generator is operated with zero VAR output to minimize output current. In certain embodiments, the VAR output may be adjusted during high-speed operation to limit the generator AC voltage.

Figure 3:
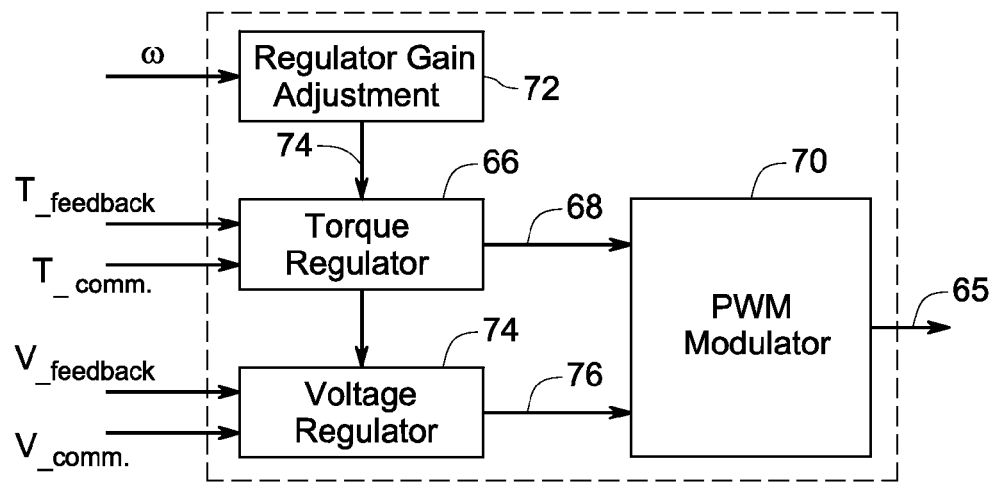
FIG. 3 is an exemplary block diagram of a line side controller according to one embodiment.

With continued reference to FIG. 2, line side controller 62 receives torque command signal $T_{\_comm}$, representing the desired torque and a measured or calculated torque feedback signal $T_{\_feedback}$ for generating a PWM control signal 65 for line side converter 56. FIG. 3 illustrates one embodiment of line side controller 62 in more detail. The illustrated line side controller 62 comprises a torque regulator 66 for receiving the torque command signal $T_{\_comm}$ and the torque feedback signal $T_{\_feedback}$ to generate a torque control signal 68, and a PWM modulator 70 for receiving the torque control signal 68 to generate PWM control signals 65. In one embodiment, torque regulator 66 uses a torque error signal $\Delta T$, which is a difference between the torque command signal $T_{\_comm}$ and the torque feedback signal $T_{\_feedback}$, to generate the torque control signal 68. Torque feedback signal $T_{\_feedback}$ can be obtained by any appropriate method. In one example, torque feedback signal $T_{\_feedback}$ is calculated from measured current on phase conductors 46 and generator flux based on measured voltage and rotation speed of the generator rotor. Line side controller 62 uses the torque command and torque feedback signals $T_{\_comm}$, $T_{\_feedback}$ to generate PWM control signals to control operations of semiconductor switches 57 of line side converter 56.

In the illustrated embodiment of FIG. 3, line side controller 62 further comprises a regulator gain adjustment module 72 for generating a regulator gain adjustment signal 74 for adjusting a control gain of torque regulator 66. In the illustrated embodiment of FIG. 3, the regulator gain adjustment module 72 uses a measured generator rotational speed (ω) to adjust the control gain of torque regulator 66. In one exemplary embodiment, the torque control signal 68 can be obtained by:

$$T = K \times \Delta T$$

wherein "T" is the torque control signal, "K" is the control gain, and "$\Delta T$" is the torque error. Control gain K is adjusted by the rotational speed ω. In certain embodiments, a higher rotational speed ω represents a higher power level, and accordingly, a larger control gain K is selected for torque control.

In the illustrated embodiment of FIG. 3, line side controller 62 further comprises voltage regulator 74 for receiving voltage command $V_{\_comm}$, representing the desired grid side converter output voltage magnitude and a measured voltage feedback signal $V_{\_feedback}$, and for generating a voltage control signal 76. In one embodiment, voltage regulator 74 uses a voltage error signal $\Delta V$, which is a difference between the voltage command signal $V_{\_comm}$ and the voltage feedback signal $T_{\_feedback}$, to generate voltage control signal 76. The voltage control signal 76 defines the magnitude of the desired output voltage to be applied to phase conductors 58 (shown in FIG. 2) whereas the torque control signal 68 defines the desired output voltage angle. In the embodiment of FIG. 3, the combination of desired voltage magnitude and angle is used by the PWM modulator 70 to generate control signals to control the output voltage applied to phase conductors 58. When there is a change in the output voltage due to changes in the grid or generator torque level, the measured three-phase voltage signal $V_{\_feedback}$ changes, and line side controller 62 controls line side converter 56 to maintain an output voltage nominally equal to the voltage command $V_{\_comm}$. In certain embodiments, line side controller 62 further regulates reactive current or VAR output.

Figure 4:
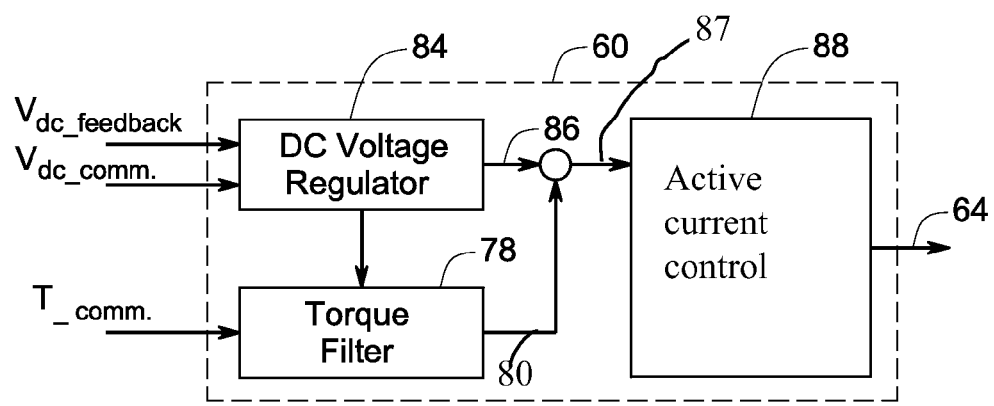
FIG. 4 is an exemplary block diagram of a generator side controller according to one embodiment.

Referring to FIG. 4, in one more specific embodiment, generator side controller 60 further receives torque command signal $T_{\_comm}$. In one embodiment, the torque command signal $T_{\_comm}$ is applied to a filter block 78. A filtered torque command 80 from the filter block 78 is used to generate the PWM control signal 64 that will increase or decrease the generator output power flow into the DC link 54, and thus to improve the torque response of the generator to better follow the torque command $T_{\_comm}$. For example, in one embodiment, when there is an increase in the wind speed, the torque command signal $T_{\_comm}$ increases, and the generator side controller 60 controls that generator side converter to output more power to the DC link 54 while maintaining the DC link voltage within a desired level. In the illustrated embodiment, generator side controller 60 further comprises a DC voltage regulator 84 for receiving the DC voltage command signal $V_{dc\_comm}$ and the DC voltage feedback signal $V_{dc\_feedback}$ and for generating a DC voltage control signal 86 which is a function of the DC voltage difference between $V_{dc\_comm}$ and $V_{dc\_feedback}$. In the illustrated embodiment, the filtered torque command 80 is used as a variable for adjusting the DC voltage control signal 86 before feeding to an active current control 88 for generating the PWM control signals 64. A higher filtered torque command 80 increases the active current control signal 87 while maintaining the generated DC voltage at the DC link 34 within a desired value. An increase in the active current control signal 87 will cause more power to flow into the DC link 54 to balance the output power flow to grid 44.

Referring back to FIG. 2, power conversion module 48 may further comprise a protective circuit or dynamic braking circuit 90 ("DB circuit 90"). In the illustrated embodiment, DB circuit 90 is coupled to DC link 54 for preventing the generator 28 and the gearbox 30 from experiencing large transient torques that may damage the gearbox during grid fault events when the grid is unable to accept the generated power. In one embodiment, DB circuit 90 comprises an energy absorbing element 92 coupled to DC link 54, and at least one DB switch 94. In one embodiment, the energy absorbing element 92 comprises one or more resistors.

In one embodiment, power conversion control system 50 comprises a DB controller 96 for controlling operations of DB circuit 90. In certain embodiments, DB controller 96 uses the torque error $\Delta T$, which is a difference of the torque command signal and the torque feedback signal $T_{\_comm}$, $T_{\_feedback}$, to generate a DB control signal 98 controlling switching operation of DB circuit 90. In one embodiment, when the torque error $\Delta T$ is greater than a threshold value $\Delta T0$, an enable signal is transmitted to actuate switch 94. When switch 94 is activated, the energy absorbing element consumes energy from the DC link 54 to increase the generator load and the corresponding torque feedback $T_{\_feedback}$ to a level determined by the torque command $T_{\_comm}$. Accordingly, when there is a grid fault that reduces the grid side converter output power, generator side converter 52 will quickly reduce the generator torque to maintain a steady DC link voltage which will induce an increase in the $\Delta T$ and cause the energy absorbing element 92 to operate and restore the generator torque loading to a nominal level to minimize gearbox wear.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   a rotary power generator for generating a variable-frequency alternating current;
   a generator side converter for converting the variable-frequency alternating current into a DC current;
   a DC link coupled to the generator side converter for receiving the DC current;
   a line side converter coupled to the DC link for converting the DC current into an alternating current with controlled amplitude or frequency;
   a generator side controller for receiving a DC link voltage command signal and a DC link voltage feedback signal and generating control signals for the generator side converter; and
   a line side controller for receiving a generator torque command signal and a generator torque feedback signal and generating control signals for the line side converter.

2. The system of claim 1, wherein the generator side controller is configured for receiving the generator torque command signal and using the generator torque command signal in addition to the DC link voltage command and feedback signals to generate the control signals for the generator side converter.

3. The system of claim 1, wherein the line side controller is configured for receiving a measured generator rotational speed to adjust gains of the control signals generated by the line side controller.

4. The system of claim 3, wherein the line side controller is further configured for receiving the grid side converter output voltage magnitude command and feedback signals to generate a voltage control signal for use in generating control signals for the line side converter.

5. The system of claim 1 further comprising a dynamic braking circuit coupled to the DC link.

6. The system of claim 5, wherein the dynamic braking circuit comprises an energy absorbing element and at least one dynamic braking switch in serial connection with the energy absorbing element.

7. The system of claim 1, wherein the rotary power generator comprises a wind turbine, a gas turbine, a micro turbine, or a marine hydro kinetic device.

8. A wind turbine power generation system comprising:
   a wind turbine for generating a variable-frequency alternating current driven by wind;
   a power conversion module comprising:
      a generator side converter for converting the variable-frequency alternating current into a DC current;
      a DC link coupled to the generator side converter for receiving the DC current;
      a line side converter coupled to the DC link for converting the DC current into an alternating current with controlled amplitude or frequency; and
   a power conversion control system comprising:
      a generator side controller for receiving a DC link voltage command signal and a DC link voltage feedback signal and generating control signals for the generator side converter; and
      a line side controller for receiving a generator torque command signal and a generator torque feedback signal and generating control signals for the line side converter.

9. The system of claim 8, wherein the generator side controller is configured for receiving the generator torque command signal and using the generator torque command signal in addition to the DC link voltage command and feedback signals to generate the control signals for the generator side converter.

10. The system of claim 8, wherein the line side controller is configured for receiving a measured generator rotational speed to adjust a gain of the control signals generated by the line side controller.

11. The system of claim 10, wherein the line side controller is further configured for receiving the grid side converter output voltage magnitude command and feedback signals to generate a voltage control signal for use in generating control signals for the line side converter.

12. The system of claim 8 further comprising a dynamic braking circuit coupled to the DC link.

13. The system of claim 12, wherein the dynamic braking circuit comprises an energy absorbing element and at least one dynamic braking switch in serial connection with the energy absorbing element.

14. A power generation system comprising:
   a rotary power generator for generating a variable-frequency alternating current;
   a generator side converter for converting the variable-frequency alternating current into a DC current;
   a DC link coupled to the generator side converter for receiving the DC current;
   a line side converter coupled to the DC link for converting the DC current into an alternating current with controlled amplitude or frequency;
   a generator side controller for receiving a DC link voltage command signal and a DC link voltage feedback signal and generating control signals for the generator side converter;
   a line side controller for receiving a generator torque command signal and a generator torque feedback signal and generating control signals for the line side converter;
   a dynamic braking circuit coupled to the DC link, the dynamic braking circuit comprising an energy absorbing element and at least one dynamic braking switch in serial connection with the energy absorbing element; and
   a dynamic braking controller for controlling operations of the dynamic braking circuit by using a difference of the torque command signal and the torque feedback signal to control switching operation of the dynamic braking switch.

* * * * *

UNITED STATES PATENT AND TRADEMARK OFFICE
CERTIFICATE OF CORRECTION

| | | |
|---|---|---|
| PATENT NO. | : 8,013,461 B2 | Page 1 of 1 |
| APPLICATION NO. | : 12/820354 | |
| DATED | : September 6, 2011 | |
| INVENTOR(S) | : Delmerico et al. | |

It is certified that error appears in the above-identified patent and that said Letters Patent is hereby corrected as shown below:

In Column 5, Line 45, delete "co" and insert -- ω --, therefor.

Signed and Sealed this
Eighth Day of November, 2011

David J. Kappos
*Director of the United States Patent and Trademark Office*